UNITED STATES PATENT OFFICE.

VIRGINIA J. WATTS, OF BALTIMORE, MARYLAND.

ARTIFICIAL MARBLE.

SPECIFICATION forming part of Letters Patent No. 251,010, dated December 13, 1881.

Application filed November 1, 1881. (No specimens.)

*To all whom it may concern:*

Be it known that I, VIRGINIA J. WATTS, of Baltimore, in the State of Maryland, have invented certain new and useful Improvements in Artificial Marble; and I do hereby declare that the following is a full, clear, and exact description thereof.

This invention relates to certain improvements in the manufacture of artificial marble for plain or ornamental work, such as table-tops, mantel-pieces, cemetery work, and for architectural and other similar purposes.

The invention consists in an improved compound or composition of matter and process of forming the same into slabs, the surfaces of which may be cheaply and conveniently made in imitation of the natural varieties of marble, and which possess the requisite degree of hardness to withstand ordinary wear and take a high polish.

My improved compound consists of a composition of rice or other starchy or farinaceous material, gum-turpentine, sulphate of soda, liquid glass, or soluble silicate of soda or potash, carbonate of ammonia, and Keen's cement, calcined plaster, or any other hydraulic cement. These ingredients may be combined in any suitable proportions and in any convenient manner, according to the nature of the work. In practice I have found the following proportions and process of combining the same to answer well for general purposes, viz: rice or other starchy or farinaceous material, ten pounds; gum-turpentine, two quarts; white shellac, three pounds; sulphate of soda, five pounds; liquid glass, one quart; carbonate of ammonia, five pounds. The rice or farinaceous material is first boiled in a sufficient quantity of water until it assumes the consistency of paste, after which it is strained into a suitable receptacle or vessel. The turpentine and shellac are then dissolved in a suitable quantity of alcohol, and the sulphate of soda, liquid glass, and carbonate of ammonia are dissolved in a suitable quantity of water. The ingredients, as thus prepared are placed in a vessel of a capacity of forty gallons, or thereabout, and water is added until it is filled. The ingredients are thoroughly mixed, and Keen's or other cement, hydraulic chalk, calcined plaster, or lime of tiel added in a dry state in sufficient quantity to form a plastic mass, the whole being thoroughly mixed. I then take a sheet of glass or other material having a smooth surface and place thereon a frame of suitable dimensions, and spread or fill the plastic mass therein. When the mass has set or hardened the slab and frame are removed, and the surface formed against the sheet of glass is polished in the usual manner, if perfect. In the case of imperfections in the face of the slab—such as air-bubbles and the like—the slab is coated with the composition by means of a suitable brush, and the composition, after remaining a while, is scraped off by means of a suitable tool, removing the superfluous portions and filling any cavities. The slab is then polished as usual.

When it is desired to imitate Tennessee, Italian, or other varieties of marble, the composition in separate lots, suitably colored, is splattered over the glass by means of the fingers or a suitable instrument to form a proper variegated surface, and the mass is formed upon the same as before mentioned, and when the slab is removed it will have a corresponding variegated surface. The slab may then be polished as before mentioned.

Having thus described my invention, what I claim, and desire to secure by Letters Patent, is—

The within-described composition for the manufacture of artificial marble, consisting of starchy or farinaceous material, gum-turpentine, sulphate of soda, liquid glass, carbonate of ammonia, and hydraulic cement, combined substantially in the proportions and manner set forth.

In testimony whereof I affix my signature, in presence of two witnesses, this 1st day of November, 1881.

VIRGINIA J. WATTS.

Witnesses:
C. M. ALEXANDER,
H. J. ENNIS.